(12) United States Patent
Aharoni et al.

(10) Patent No.: US 9,350,758 B1
(45) Date of Patent: May 24, 2016

(54) DISTRIBUTED DENIAL OF SERVICE (DDOS) HONEYPOTS

(71) Applicant: EMC Corporation, Hopkinton, MA (US)

(72) Inventors: Idan Aharoni, Herzeliya (IL); Mirit Hirsh, Oranit (IL); Anton Gartsbein, Petah-Tikva (IL); Nir Avnery, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 187 days.

(21) Appl. No.: 14/040,305

(22) Filed: Sep. 27, 2013

(51) Int. Cl.
*H04L 29/06* (2006.01)
*G06F 9/50* (2006.01)
*G06F 21/57* (2013.01)
*G06F 21/55* (2013.01)
*H04L 29/08* (2006.01)

(52) U.S. Cl.
CPC ............ *H04L 63/1458* (2013.01); *G06F 9/505* (2013.01); *G06F 21/55* (2013.01); *G06F 21/577* (2013.01); *H04L 63/145* (2013.01); *H04L 63/1408* (2013.01); *H04L 63/1416* (2013.01); *H04L 63/1425* (2013.01); *H04L 63/1441* (2013.01); *H04L 63/1483* (2013.01); *H04L 67/10* (2013.01); *H04L 67/306* (2013.01); *H04L 67/325* (2013.01); *H04L 67/327* (2013.01); *H04L 67/34* (2013.01)

(58) Field of Classification Search
CPC ....... G06F 9/505; G06F 21/577; G06F 21/55; H04L 29/06; H04L 63/1408; H04L 63/1416; H04L 63/1425; H04L 63/1441; H04L 63/145; H04L 63/1483; H04L 67/34; H04L 67/306; H04L 67/325; H04L 67/10; H04L 67/327; H04L 69/329; H04L 63/0227; H04L 63/164
See application file for complete search history.

(56) References Cited

U.S. PATENT DOCUMENTS

| | | | |
|---|---|---|---|
| 8,726,379 B1 * | 5/2014 | Stiansen et al. | 726/22 |
| 8,856,869 B1 * | 10/2014 | Brinskelle | 726/2 |
| 2005/0166072 A1 * | 7/2005 | Converse et al. | 713/201 |
| 2006/0161816 A1 * | 7/2006 | Gula et al. | 714/39 |
| 2011/0238855 A1 * | 9/2011 | Korsunsky et al. | 709/231 |

* cited by examiner

Primary Examiner — Mohammad A Siddiqi
(74) Attorney, Agent, or Firm — BainwoodHuang

(57) ABSTRACT

An improved system and method of measuring and evaluating a distributed denial of services (DDOS) attack includes arranging for a DDoS attack by engaging a network provider offering malicious services to attack a honeypot computerized device. The honeypot includes a packet sniffer used to measure the values of parameters of the DDoS attack useful in determining the method of attack, the origin and extent of the attack, in calculating methods for early determination that a DDoS attack is occurring, and methods of countering this type of DDoS attack before it occurs.

17 Claims, 3 Drawing Sheets

DISTRIBUTED DENIAL OF SERVICE (DDOS) HONEYPOTS

BACKGROUND

Distributed Denial of Services (DDoS) attacks occur when multiple systems flood the bandwidth or resources of a targeted system such as a server hosting a website. Because DDoS attacks may not result in hacking into a website, but rather act more like normal business communications, they may be harder to identify as an attack.

Conventional methods for reducing the impact of DDoS attacks include deliberately infecting one's own computer with DDoS malware in order to understand how a computer can be used as part of what is known as a botnet (i.e., a network of infected machines) to target other machine on a command from a controller machine. This may allow identification of the orders the members of a botnet receive, the IP address of the machine issuing the attack command, and identify those responsible for the attacks. Websites may monitor the normal traffic generated when browsing websites and E-mail traffic to help determine whether the traffic has different characteristics than are associated with normal business traffic to determine if a DDoS attack is occurring and where it originated. Websites may also use blacklists may be used to block messages from known attackers.

SUMMARY

Unfortunately, there are deficiencies with the above-described conventional methods. For example, such methods either react during or after a DDoS attack has started, or by becoming a part of the attack on another computer, or thus do not provide notice of an imminent DDoS attack. Being reactive limits the computer to real time analysis and does not permit the attacked website to prepare to analyze a DDoS attack, thus making analysis more difficult and limiting knowledge regarding distinguishing characteristics of the DDoS attack. Knowing the distinguishing characteristics of a specific type of DDoS attack may help determine the difference between a DDoS attack and normal (but unusually heavy) website business transactions. Knowing the distinguishing characteristics of a DDoS attack can also help set up rules to more quickly filter out the DDoS traffic, which may enable only the legitimate traffic to access the website and be served.

In contrast to the above-described conventional methods which result in insufficient learning about DDoS attacks, an improved technique involves arranging for a DDoS attack to take place on a specifically designated computing device. Along these lines, a website may set up a honeypot server with an IP address that hosts a website, and a packet sniffer. An agent, such as a computer with a different IP address than the honeypot, or an investigator, may search a network seeking providers of malicious services such as DDoS attacks. The agent may investigate the various providers, determine if a DDoS attack having characteristics of interest, such as a modified method of attack not previously examined, is being offered, and determine whether to engage the provider to attack the honeypot, or false website. When the honeypot is attacked the packet sniffer records and analyzes the attack. With such an arrangement, information on the origin, source, method, protocol, patterns, command and control systems, the use of "bots", and the instigating party for the DDoS attack may be obtained, and counter measures may be devised before a DDoS attack on an actual website occurs.

In an embodiment, a method of protecting a server hosting a website from a distributed denial of service (DDoS) attack may include connecting a computerized device including a packet sniffer to an external network. The packet sniffer may record communications from the external network to the computerized device. In general any communication to the false website honeypot is likely to be a DDoS attack, since the honeypot may not be conducting any real business. The packet sniffer may record the DDoS attack, and may obtain values of parameters of the DDoS attack that are of interest in determining the origin and methodology of the DDoS attack. The computerized device may evaluate the parameter values and calculate potential defensive actions to that particular DDoS attack, and provide the defensive actions to the server hosting the website for future DDoS attacks. The computerized device may have a memory for storing the identity of the DDoS attack and the parameter values used in the attack, and a communications circuit for transmitting the calculated defensive actions to endangered websites, servers and customers.

In an embodiment, a system constructed and arranged to protect a server hosting a website from DDoS attack may include a computerized device communicatively connected to a network, and a packet sniffer connected to the computerized device to detect communications from the network to the computerized device. The system may include a logic circuit to measure values of parameters of the communications from the network to the computerized device, and a memory device to store the values of the parameters detected by the logic circuit.

The logic circuit may analyze the values of the parameters of the communication, or DDoS attack, to determine if the communication is an actual DDoS attack, and also determine parameters of the attack, such as the origin of the attack and the method of the attack. The logic circuit may also check the memory to determine whether a previously known attack had parameter values that were within the range of the present attack. A method of defending against the present attack, and a method to shut down the attacker may be calculated. There may be communication circuitry to transmit the method of defending against the present attack to the server hosting the website. The logic circuit, the memory, communicating circuitry and the packet sniffer may be parts of the computerized device, or may be separate devices that are communicatively connected to the computerized device, or each other.

In an embodiment, a computer program product having a non-transitory, computer-readable storage medium storing a computer code designed to protect a server hosting a website from DDoS attack may include instructions to configure a computerized device including receiving circuitry to communicatively connect to a network. The computerized device may have no direct connection to the server hosting the website and may have a different IP address. The instructions may configure a packet sniffer circuit on the computerized device to detect communications from the network to the computerized device, and may configure a measuring circuit to detect values of parameters of the communications from the network. The instructions may include code to configure a memory device to store the measured values of the parameters, and configure a logic circuit to analyze the values of the parameters of the communication. The logic circuit may determine if the communication is a DDoS attack, and may be able to determine an origin of the attack, a method used in the attack, and whether a previous attack was similar to the present attack. The logic circuit may calculate a method of defending against the present attack, or a method to shut down the attacker. The instructions may also configure communication circuitry to transmit the method of defending against the present attack to the server hosting the website.

In the various described embodiments, the computerized device may not have any identifiable connection to the server hosting the website, and may have a different network address than the server or the website. The agent computer likewise may have a different network address than the computerized device, server or website.

The circuitry to detect values of parameters of the DDoS attack may include obtaining values of an IP address from which the attack originates, the time of the attack, the IP protocol used in the attack, the HTTP header of the attack origin location, what type of attack is used, and measuring the number of attack locations and whether each attack location is either a group of servers or a botnet.

The type of attack may include a consumption of calculation bandwidth resources attack, consumption of data storage resources attack, and consumption of processor resources attack. The attack may be determined to be a disruption of configuration information attack, a disruption of state information attack, or a disruption of physical components of the computerized device attack. The attack may be a botnet attack, an Email bomb attack, a consumption of communication media resources attack, a peer to peer attack, a retransmission time-out attack, a SYN flood of TCP/SYN packets with forged sender IP addresses, or a tear drop attack including improper IP address fragments with oversized payloads. The attack may be a spoofing attack by forging a sender IP address, an ICMP flood attack, a ping flood attack, a Smurf attack, or a file sharing hub Puppet Master Attack.

The method of defending against future attacks using the present type of method, can be sent to the server hosting the website and may include identifying whether an attack is occurring, blocking incoming communications from the attack website IP address, blacklisting the IP address of the originator of the attack, initiating a take-down operation of the originator IP address, or communicating with law enforcement to punish the attacker website.

Such an arrangement may provide context for the attack and avenues of both protection from, and attack upon, the originators of a DDoS attack, as well as assisting a website in determining if a DDoS attack is occurring.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique for mitigating DDoS attacks involves arranging for a DDoS attack to take place on a designated computing device that is enabled to record and analyze the attack. Malicious service providers are investigated and selected to engage in a DDoS attack on a target website acting as a honeypot. The attack parameters and attack patterns may be recorded and analyzed, and defensive reactions may be calculated and transmitted to the server hosting a website.

Figure 1:
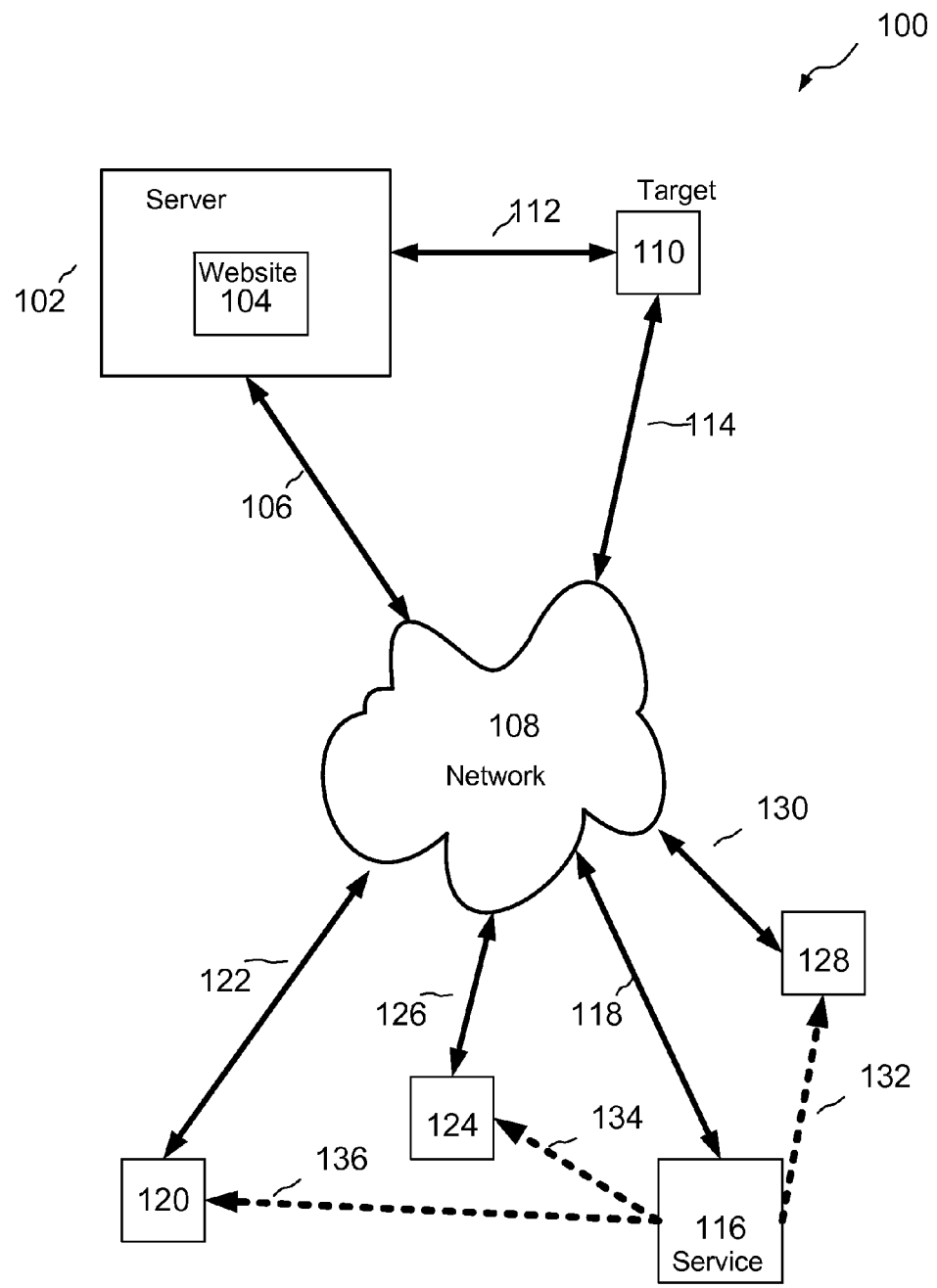
FIG. 1 is a block diagram illustrating an electronic environment in which the improved technique may be carried out.

FIG. 1 is a block diagram illustrating an electronic environment 100 in which the improved technique may be carried out, including computerized device 110 (target) acting as a honeypot. The system 100 is constructed and arranged to carry out the improved technique in which a honeypot 110 records DDoS attacks coming from a network 108, and obtains and evaluates parameter values of the specific DDoS attack. The electronic environment 100 also includes a server 102 which hosts at least one website 104, and a communication line 106 to the network 108. Communication lines 106 may be bidirectional and may include wired, wireless or other methods of communication of digital or analog signals. The website 104 may have previously been attacked and wish to proactively take steps to prevent or reduce the severity of potential future DDoS attacks on its operation and business transactions.

A computerized device 110 is connected to the network 108, has an IP address, and may include a website. The computerized device 110 is used as a target of a DDoS attack via the network 108 and may include what is known as a packet sniffer to detect incoming data packets from the network 108 to the computerized device 110 via communications line 114, and measure the features and parameters of the incoming data packets. The packet sniffer may be a part of the circuitry of the computerized device 110, or it may be a separate device communicatively connected to computerized device 110.

A DDoS attack on computerized device 110 may be obtained by scanning the websites connected to the network 108, for example, websites 116, 120, 124 and 128, and examining them for advertisements, or other indications, of malicious intent such as selling targeted DDoS attacks. For example, website 116 is a service provider that offers DDoS attacks for sale. An agent engaging the service 116 to commit a DDoS attack on computerized device 110 might be a part of server 102, or a separate computer having a separate IP address, or a person telephoning a number found on the website of service 116, or any of many easily understood methods of engaging a service.

If service 116 were to directly attack computerized device 110 via communications line 118, the network 108 and communication line 114 with repeated rapid requests for contact, or any of many other known methods for overloading or reducing communications capacity, the attack may not be very effective since it is only a single attacker. Such a direct attack may have an additional problem since the IP address of service 116 may be visible in each of the communication requests. Thus, the fact that an attack is occurring may be easily determined by computerized device 110. A different method of DDoS attack that may be used by service 116 may include hacking into innocent websites 120, 124 and 128, via the network 108 for example, and loading malicious software into the websites 120, 124 and 128. The malicious software may be activated by a key message sent from service 116 by network 108, or by other communications methods such as 132, 134 and 136 (shown as dotted arrows) ordering websites 120, 124 and 128 to launch a DDoS attack on computerized device 110 via associated communications lines 122, 126 and 130 and the network 108. Thus the effectiveness of the DDoS attack may be multiplied by three times, and the ID of service 116 obscured.

Service 116 may launch DDoS attacks of various types. There may be five basic general types of DDoS attack, including consumption of resource attacks. This form of attack may include filling up available communications bandwidth, or filling up available memory space, or consuming processor time. A second general type of DDoS attack disrupts configuration information, such as by changing data packet routing values, which may result in misdirected data. A third general type of attack may disrupt what may be known as state information, such as resetting TCP sessions and losing existing calculation processes. A fourth general type of attack may disrupt some of the physical components of the network communications structure. A fifth general type of attack may obstruct network communications media.

Figure 2:
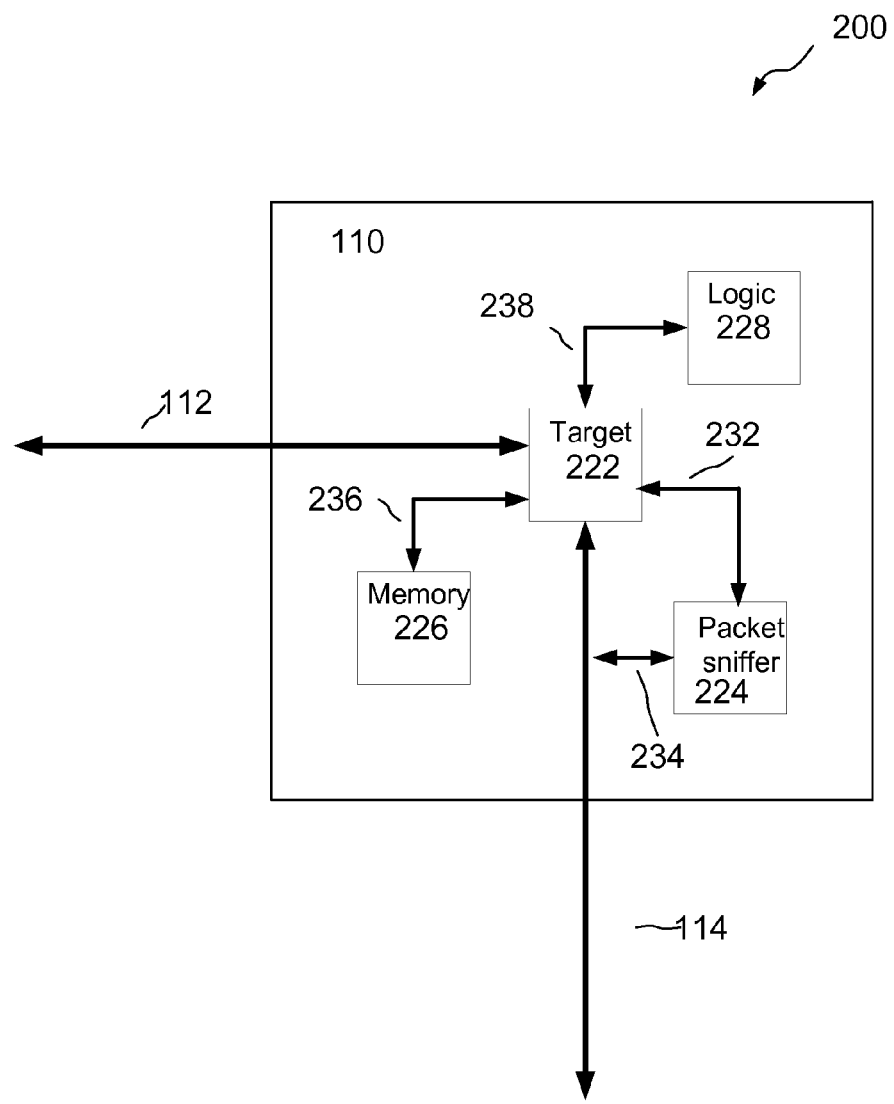
FIG. 2 is a block diagram of portions of a honeypot as included within the electronic environment in FIG. 1.

When the DDoS attack on the honeypot occurs, the honeypot will be ready to record and analyze the features and characteristics of the attack. FIG. 2 is a block diagram of portions of a honeypot as included within the electronic environment shown in FIG. 1, and includes the operational connections within the honeypot. Computerized device 110 of FIG. 1 is set up to be attacked by a DDoS type attack, and is enabled to detect the attack, measure the parameters of the attack, determine the pattern of attack, and compare the current attack to previously experienced DDoS attacks.

Computerized device 110 may include communication line 114 for connection to the network 108, and may include communication line 112 for direct communication to server 102. A DDoS attack coming from the network 108 via communication line 114 to attack a website target 222 that is part of the computerized device 110, may be detected by a packet sniffer 224 via a sensor or communication line 234. The packet sniffer 224 may measure values of various parameters of the DDoS attack, such as IP address of the data packet sender, the message protocol such as the transmission control protocol (i.e., TCP), behavior, or characteristics such as whether the attack is from a single server, a group of servers, or what may be known as a botnet.

The packet sniffer may obtain the values of the parameters of the attack and send them to a memory location 226 for storage, and to a logic circuit 228 for analysis. The logic circuit 228 may search the memory to determine if the present attack is similar to a previously recorded attack, and may calculate countermeasures to prevent such an attack from occurring. The website target 222 may include communication means for sending the attack information and the calculated counter measure via communication line 112 to the server 102, or via communication line 114 to a central data storage and analysis center for more intensive or long term analysis.

Figure 3:
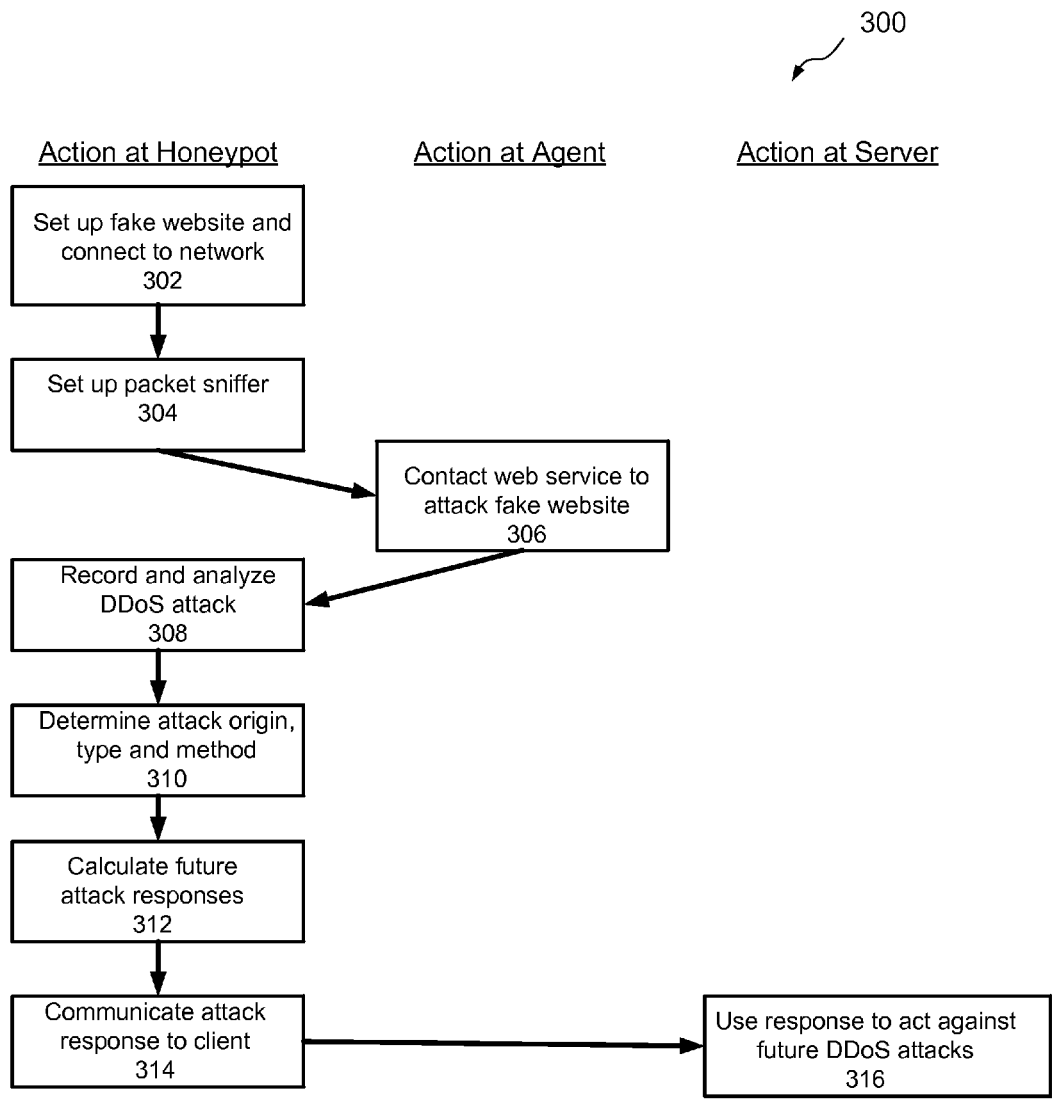
FIG. 3 is a flowchart illustrating a method of carrying out the improved technique.

FIG. 3 is a flowchart illustrating a method of carrying out the improved technique. A procedure 300 is used to create a DDoS attack and for analysis of the attack. In this illustrative embodiment the actions are separated into three portions to render the process more understandable, and it is not required that there be more than a single computer actor. It may be more efficient to hide the identity of the various portions of the present subject matter in order to engage the service provider to commit the DDoS attack, so a different IP address for the agent, server, website and honeypot may be used.

Actions at the honeypot (i.e., the computerized device 110 shown in FIGS. 1 and 2) may include at step 302, setting up a fake website to be attacked and connecting the fake website to the network 108 with an IP address, typically a different IP address than that of the server 102 or the website 104. At step 304 the computerized device 110 sets up a packet sniffer 224 to measure values of parameters of communications from the network 108.

At step 306 an agent searches the network 108 and contacts service providers indicating an interest in performing malicious services such as a DDoS attack. The agent may be a separate computer having a different IP address than the computerized device 110, server 102 or website 104, or the agent may be a portion of the computerized device 110, or the agent may be any other entity working to engage a DDoS attack on the honeypot. The agent may examine various network advertisements offering to launch DDoS attacks, and may determine if the specific method of attack, or other features may have already been examined previously. Based upon the agent examination, the agent determines to engage a particular service provider and may enter negotiations for a price for the attack.

At step 308 the packet sniffer 224 records the DDoS attack and obtains parameter values. The computerized device 110 may include analysis circuitry to evaluate and identify the source and method of the DDoS attack, and may record the details of the attack. At step 310 the computerized device 110 has finished the analysis of the DDoS attack and has determined the origin, general type and the method of attack.

At step 312 the logic circuits 228 of the computerized device 110 have calculated responses and countermeasures for future DDoS attacks of the type measured, and at step 314 the computerized device 110 communicates the attack parameters and countermeasure responses to either the server 102 or a central analysis location for combination with past history, generally acknowledged defensive methods and further detailed analysis.

Finally, at step 316, the server 102 uses the communicated information from the computerized device 110 to adjust its attack defenses proactively and prior to the same type of DDoS attack occurring against the server 102. Then the method repeats itself to continue to adapt to the ongoing improved capability of the criminal element.

The improved method and device may include a computerized device 110 that is specially constructed as a recorder and analyzer of data packet streams, or alternatively it may be a general purpose computer programmed using a non-transitory computer readable medium storing code to perform the recording, analyzing, calculating and transmitting functions described above. While various embodiments of the invention have been particularly shown and described, it will be understood by those skilled in the art that various changes in form and details may be made therein without departing from the spirit and scope of the invention as defined by the appended claims.

What is claimed is:

1. A method of protecting a server hosting a website from distributed denial of service (DDoS) attacks, the method comprising:

connecting a computerized device that includes a packet sniffer to an external network, the packet sniffer enabled to record all communications from the external network to the computerized device;

recording, with the packet sniffer, a DDoS attack resulting from engaging a provider offering malicious services to attack the computerized device using the DDoS attack;

obtaining, by the computerized device, values of parameters of the DDoS attack that are indicative of origin and methodology of the attack; and providing, by the computerized device, defensive actions to the server hosting the website for preventing future DDoS attacks based on the values of the parameters obtained;

wherein engaging the provider includes, prior to recording the DDoS attack:

searching the external network by a computer for advertisements by a plurality of websites offering to commit DDoS attacks, each individual website using at least one of a plurality of different methods of attack;

selecting at least one of the plurality of sites based upon at least one of a method of attack, the IP address of the provider, and prior experience with the provider; and running a software program on the computer to electronically communicate with the provider via the external network, offering to pay for a DDoS attack on the computerized device; and the computer includes an IP address that is different from an IP address of the computerized device to be attacked; and wherein searching the external network by the computer for advertisements by websites offering to commit DDoS attacks further includes the computer using a different IP address from IP addresses of the server hosting the website and the computerized device.

2. The method of claim 1, wherein selecting the at least one of the plurality of websites includes:

scanning a memory location of the computerized device for presence of the selected site and the at least one of the plurality of methods;

evaluating whether to engage the provider offering malicious services based at least in part on the presence of the selected site, the method and a date in the memory location; and storing the selected site, the method, and a current date in the memory location.

3. The method of claim 1, wherein the obtaining values of parameters includes obtaining an IP address of at least one site on the external network from which the attack originates, the time of the attack, an IP protocol used in the attack, a HTTP header, and the type of attack.

4. The method of claim 3, wherein obtaining values of parameters including the IP address of at least one site from which the attack originates includes measuring a number of attack locations, and whether each attack location is at least one of a group of servers, and a botnet.

5. The method of claim 3, wherein the obtaining values of parameters including the type of attack includes determining at least one of a consumption of calculation bandwidth resources attack, consumption of data storage resources attack, consumption of processor resources attack, disruption of configuration information attack, disruption of state information attack, disruption of physical components of the computerized device attack, an Email bomb attack, consumption of communication media resources attack, a peer to peer attack, a botnet attack, a retransmission time-out attack, a SYN flood of TCP/SYN packets with forged sender IP addresses, a tear drop attack with improper IP address fragments with oversized payloads, spoofing by forging a sender IP address, an ICMP flood attack, a ping flood attack, a Smurf attack, and a file sharing hub Puppet Master attack.

6. The method of claim 1, wherein the providing defensive actions to the server hosting the website includes providing at least some of the values of parameters of the DDoS attack that are indicative of origin and methodology of the attack, including at least one of an IP address of an attacking site, a method of the attack, a time of the attack, and an originator of the attack.

7. The method of claim 6, wherein the providing defensive actions to the website includes using the values of parameters of the DDoS attack for identifying whether an attack is occurring, and implementing at least one of blocking incoming communications from the attack website IP addresses, black-listing the IP address of an originator of the attack, initiating a take-down of an originator IP address, and communicating with law enforcement.

8. A system constructed and arranged to protect a server hosting a website from DDoS attacks, the system comprising:

a computerized device communicatively connected to a network;

a packet sniffer connected to the computerized device to detect communications from the network to the computerized device;

a logic circuit connected to the computerized device to measure values of parameters of the communications from the network to the computerized device;

a memory device connected to the computerized device to store the values of the parameters detected by the logic circuit;

the logic circuit constructed and arranged to analyze the values of the parameters to determine if a communication from the network is a present DDoS attack, and determine at least one of an origin of the attack, a method of attack, whether a previous attack included parameter values within a selected range of the present attack, a method of defending against the present attack, and a method to shut down the attacker; and communication circuitry included in the computerized device to transmit from the logic circuit at least the method of defending against the present attack to the server hosting the website;

wherein the logic circuit is further constructed and arranged to record a DDoS attack resulting from engaging a provider offering malicious services to attack the computerized device using a DDoS attack;

wherein the logic circuit constructed and arranged to engage the provider is further constructed and arranged to, prior to recording the DDoS attack:

search the network by a computer for advertisements by a plurality of providers offering to commit DDoS attacks, each individual provider using at least one of a plurality of different methods of attack;

select at least one of the providers based upon at least one of a method of attack, the IP address of a provider, and prior experience with the provider; and run a software program on the computer to electronically communicate with the at least one of the selected providers via the external network, offering to pay for a DDoS attack on the computerized device; and the computer includes an IP address that is different from an IP address of the computerized device to be attacked; and wherein the logic circuit constructed and arranged to search the external network by the computer for advertisements by websites offering to commit DDoS attacks is further constructed and arranged to have the computer use a different IP address from IP addresses of the server hosting the website and the computerized device.

9. The system of claim 8, wherein the computerized device has a different network address than the server or the website, and wherein the computerized device communicates to the server via the network and has no direct connection to the server or the website.

10. The system of claim 8, wherein;

an external agent communicates with the network to engage a provider offering malicious services to attack the computerized device with a DDoS attack, wherein the external agent has a different network address than the server, the website or the computerized device, and no direct connection to the server or the computerized device; and the external agent comprises an electronic device communicatively connected to the network, communicating directly with the provider offering malicious services.

11. The system of claim 8, wherein the logic circuit to detect values of parameters includes obtaining values of at least one of:
- an IP address of at least one site on the network from which the attack originates;
- a time of the attack;
- an IP protocol used in the attack;
- a HTTP header of an attack origin location;
- a type of attack of at least one attack origin location;
- an IP address of at least one attack origin location; and
- measuring a number of attack locations and whether each attack location is at least one of a group of servers, and a botnet.

12. The system of claim 11, wherein obtaining values of parameters including the type of attack, includes at least one of:
- determining at least one of a consumption of calculation bandwidth resources attack, consumption of data storage resources attack, and consumption of processor resources attack;
- determining at least one of a disruption of configuration information attack, a disruption of state information attack, and a disruption of physical components of the computerized device attack;
- determining at least one of an Email bomb attack, consumption of communication media resources attack, a peer to peer attack, and a botnet attack;
- determining at least one of a retransmission time-out attack, a SYN flood of TCP/SYN packets with forged sender IP addresses, and a tear drop attack including improper IP address fragments with oversized payloads; and
- determining at least one of a spoofing attack by forging a sender IP address, an ICMP flood attack, a ping flood attack, a Smurf attack, and a file sharing hub Puppet Master attack.

13. The system of claim 8, wherein transmit at least the method of defending against the present attack to the server hosting the website includes at least one of:
- identifying whether an attack is occurring;
- blocking incoming communications from the attack website IP addresses;
- blacklisting the IP address of an originator of the attack;
- preparing to initiate a take-down of an originator IP address; and
- communicating with law enforcement.

14. A computer program product having a non-transitory, computer-readable storage medium which stores computer code to protect a server hosting a website from DDoS attacks, the computer code including instructions to cause a computer to:
- configure, on a computerized device having no direct connection to the server hosting the website, receiving circuitry to communicatively connect to a network;
- configure a packet sniffer circuit on the computerized device to detect communications from the network to the computerized device;
- configure a measuring circuit on the computerized device to detect values of parameters of the communications from the network to the computerized device;
- configure a memory device on the computerized device to store the values of the parameters detected by the measuring circuit;
- configure a logic circuit on the computerized device to analyze the values of the parameters to determine if a communication from the network is a present DDoS attack, and determine at least one of an origin of the attack, a method of attack, whether a previous attack included parameter values within a selected range of the present attack, a method of defending against the present attack, and a method to shut down the attacker; and
- configure communication circuitry on the computerized device to transmit from the logic circuit at least the method of defending against the present attack to the server hosting the website;

wherein:
the computer code includes instructions to configure the computerized device with a different network address than a network address of the website; and
the computer code includes instructions to:
- configure an electronic device having a different network address than the computerized device to communicate with the network to engage a provider offering malicious services to attack the computerized device with a DDoS attack; and
- record the DDoS attack resulting from engaging the provider;
  wherein engaging the provider includes, prior to recording a DDoS attack:
  - searching the network by a computer for advertisements by a plurality of websites offering to commit DDoS attacks, each individual website using at least one of a plurality of different methods of attack;
  - selecting at least one of the plurality of sites based upon at least one of a method of attack, the IP address of the provider, and prior experience with the provider; and
  - running a software program on the computer to electronically communicate with the provider via the external network, offering to pay for a DDoS attack on the computerized device; and
wherein searching the external network by the computer for advertisements by websites offering to commit DDoS attacks further includes the computer using a different IP address from IP addresses of the server hosting the website and the computerized device.

15. The computer program product of claim 14, wherein the circuit to detect values of parameters includes obtaining values of at least one of:
- an IP address of at least one site on the network from which the attack originates;
- a time of the attack;
- an IP protocol used in the attack;
- a HTTP header of an attack origin location;
- a type of attack of at least one attack origin location;
- an IP address of at least one attack origin location; and
- measuring a number of attack locations and whether each attack location is at least one of a group of servers, and a botnet.

16. The computer program product of claim 15, wherein obtaining values of parameters including the type of attack, includes at least one of:
- determining at least one of a consumption of calculation bandwidth resources attack, consumption of data storage resources attack, and consumption of processor resources attack;

determining at least one of a disruption of configuration information attack, a disruption of state information attack, and a disruption of physical components of the computerized device attack;

determining at least one of an Email bomb attack, consumption of communication media resources attack, a peer to peer attack, and a botnet attack;

determining at least one of a retransmission time-out attack, a SYN flood of TCP/SYN packets with forged sender IP addresses, and a tear drop attack including improper IP address fragments with oversized payloads; and determining at least one of a spoofing attack by forging a sender IP address, an ICMP flood attack, a ping flood attack, a Smurf attack, and a file sharing hub Puppet Master attack.

17. The computer program product of claim 14, wherein transmit at least the method of defending against the present attack to the server hosting the website includes at least one of:

identifying whether an attack is occurring;

blocking incoming communications from the attack website IP addresses;

blacklisting the IP address of an originator of the attack;

preparing to initiate a take-down of an originator IP address; and communicating with law enforcement.

\* \* \* \* \*